United States Patent [19]

Gimelli

[11] 3,879,751

[45] Apr. 22, 1975

[54] COURT REPORTING DICTATING SYSTEM AND METHOD

[76] Inventor: Joseph Julius Gimelli, 8320 W. Boulevard Dr., Alexandria, Va. 22308

[22] Filed: Jan. 5, 1973

[21] Appl. No.: 321,270

[52] U.S. Cl............ 360/13; 179/100.1 DR; 360/31; 360/71; 360/90

[51] Int. Cl... G11b 27/36; G11b 15/10; G11b 5/86

[58] Field of Search........... 179/100.2 MD, 100.2 S, 179/100.1 DR, 100.1 R; 35/35 C; 360/13, 31, 63, 90, 71

[56] References Cited

UNITED STATES PATENTS

| | | | |
|---|---|---|---|
| 3,703,774 | 11/1972 | Goshima | 179/100.2 MD |
| 3,705,271 | 12/1972 | Bell et al. | 179/100.2 MD |
| 3,728,494 | 4/1973 | Kobler et al. | 179/100.2 MD |
| 3,777,072 | 12/1973 | Kolpek et al. | 179/100.2 MD |

*Primary Examiner*—Alfred H. Eddleman

[57] ABSTRACT

A system for use by court reporters in recording court proceedings, legislative hearings and the like, wherein at least a double track recording tape system is used, with one track for repeat, correction and/or editing by the court reporter of the oral statements, and another track utilized for the direct recording of any multiple number of microphones as may be required, e.g., as before a judge, the witness, the respective counsel, and so on. The primary record head for the above is accompanied by a follower playback head, which enables pickup and playback from either track (which proceeds through each head in sequence) to the receiving earphone of the operator or reporter. Thus the latter, by suitable adjacent and conventional switch means, may playback either or both of the tracks of the tape, and immediately after recording by the record head. This enables the reporter, inter alia, to check or monitor the operation of the record head, i.e., to verify the fact that the audio from all microphones, including his own, are operational. The reporter may thus optionally, intermittently or continuously, so check the recording of all voices by the instantaneous playback of the record tracks, and including playback of his own constructed dictation of the statements made by the speakers or witnesses at the involved proceeding.

2 Claims, 3 Drawing Figures

COURT REPORTING DICTATING SYSTEM AND METHOD

BACKGROUND OF THE INVENTION

The instant invention revolves about a system and method for reporting court proceedings, legislative hearings, etc., where a verbatim transcript is desired. It is designed to replace and supplant the conventional methods which have for years traditionally used either machines of the Stenotype kind or, as more generally in former years, manual shorthand. In this system of the invention, the reporter, rather than thus manually writing in one way or another what the speakers or witnesses say, repeats almost simultaneously their oral statements. In this manner the court reporter is able to edit or construct into the recorded transcript, and immediately at that time, the necessary information which he would in any event redictate for later transcription by a competent stenographer. In other words, in this system the court reporter practically simultaneously dictates what is being said into the recording instrument. Such enables him to insert at that time such matters as: paragraphs, punctuation, observations as to exhibit numbers, the silence of the witness when asked a question, the fact that a witness is examining a certain document before replying to a question, and such like.

This method of reporting also greatly expands the number of potential candidates for providing this type of work. Stenotype or shorthand competence, particularly for court reporting where the voices may be simultaneous or overlapping with more than one person speaking at a given instant, takes many years to develop to adequacy. Experience has shown that only those with unusual aptitude for this type of work reach a stage of true competence. On the other hand, with my system, it is possible for anyone with good comprehensive ability and more than average language background to be trained as a competent reporter within just a few months. Furthermore, trainees for such a system need not be of a type with that certain specialized aptitude which is necessary to learn reporting using the Stenotype machine, or the other familiar types of shorthand methods known to the art.

In the system or method of this invention the instrument used to record employs two channels, or two tracks, at one time. When the reporter repeats uttered statements into, for example, channel one or track one of the record track he constructs the finished sentence in an acceptable form to faithfully reproduce the intent of the speaker. For this track, or channel one, the reporter uses his own microphone. The latter can be equipped with a simple start-stop switch which actuates the recorder as to both tracks thereof.

Channel two, or track two, records audio through a microphone mixer, which can be separate or built into the tape recorder, the latter being designed to accommodate any number of microphones from one on up, each one being placed before a different speaker (as witness, judge, counsel, etc.) and each microphone being individually controlled as to volume or decibel strength. On this channel two the voice of the participants to a proceeding are directly recorded. Thus, side by side, the operator has available the dictation of his own transcript and, also, split-second replay of the voices of the several speakers. With regard to the latter, in the instant scheme the tape recorder is provided with a separate record and playback head, the latter spaced away from the record head to enable replay within a split second, and as to both tracks, after recording on the record head. The reason for this is as above indicated - to enable the reporter to monitor what is being said by use of the playback head. When he picks up what has been recorded on the record head from the playback head, because of the gap or short space in between the two, he hears the recorded signal immediately after it has been spoken. Such occurs with much the same effect as happens when one listens to a movie somewhat out of synchronism with the picture visually displayed.

A basic reason for this monitoring type of operation is to completely assure the operator or reporter that what has been spoken by those involved has indeed been recorded. When the operator hears it from the playback head, therefore, he is reassured that everything is operating properly and, to wit, that the speakers' voices are being recorded and, also, that his own dictation in editing of such audio is being recorded. In effect, and most of the time (because he uses a combination earphone/microphone to monitor) he picks up the voices from the playback head. This accomplishes two primary functions: firstly, and as stated, he is assured that the machine is recording; and secondly, if any of the speakers are difficult to hear, he need only increase the volume on the microphone nearest that speaker with the result that the sound will now be picked up loud and clear and with the same volume as that of the other speakers' voices on the other microphones before each of them.

In this novel system, the same is also so arranged that the reporter has an option of monitoring from either the record or the playback head. However, monitoring from the record head is not really a true monitoring; the only advantage thereof is derived when the voices are amplified at the same instant the words are spoken and thus without the delay inherent with monitoring from the playback head. Thus, in this recording method the reporter has two options for listening: firstly: constant monitoring from the playback head; and secondly: monitoring from the record head and then only occasionally, in order to assure recording is being made properly, monitoring from the playback head. This is easily done by activation or deactivation of a suitable switch means in interconnection with the playback head, and of course with respect to both tracks on the record tape fed through that head.

With the utilization of an expert reporter equipped with this system, who necessarily must be an expert dictator, the latter need then simply turn the recorded tape (his track one dictation) over directly to a typist for a finished transcript. The resultant product is not only easier and quicker to achieve, but also more accurate. In addition, when an attorney questions the transcript, he need merely listen to channel two on which is directly recorded his own voice as well as the voices of other participants. He may thus obtain verification of precisely what was said by each participant.

The prior art does illustrate recording systems designed to be used in connection with transcripts developed through court proceedings or legislative hearings, etc. However, although tape recorders may be used, the art also illustrating tapes having many more tracks than that here referred to, these systems are adapted merely for the recording of audio at a given hearing. They have not been used so as to permit the reporter to practically simultaneously dictate an accurate version of all voices, to also monitor the same (as to each track) for further accuracy, or to permit facile adjustment of the volume of each statement to balance them all out with equal volume for accuracy and ease of dictation by the reporter.

OBJECTS OF THE INVENTION

It is therefore a primary object of this invention to provide a system and/or method wherein an operator, such as a court reporter, may simultaneously edit and construct the spoken sentences of those participating in a given proceeding, while at the same time monitoring, and again almost simultaneously, all of the recorded statements made, the latter including the operator's own recorded dictation of the transcript as he accurately constructs the same.

It is another objective of the invention to provide such a system wherein the recording device includes a tape having a double track; one track recording all voices at the involved hearing and the other track recording the operator's simultaneous redictation of the oral statements then made. With regard to this function of the recorder, the audio on each of the said two tracks of the tape is permanently preserved. The audio record of the uttered statements of others thus being available for later replay to check the accuracy of the operator's simultaneous dictation.

It is another object of the invention to provide such a double-track record system with an immediate playback device so arranged as to playback, immediately after recording, all of the statements made, and this at the option of the operator. In this sense the reporter may not only verify the fact that the recorder is truly operating correctly, but may also immediately check his own dictation with the statements made and recorded so that the reporter can immediately rectify any dictation he has made which does not precisely correspond to said recorded statements.

It is a further object of the invention to provide a system of the type mentioned wherein the operator has at hand a readily controllable switching device which enables him to playback from either track, one recording his own voice and the other recording the voices of others; in other words, he may operate the playback from either track one or track two, or merely monitor the record track which carries only the voices of others attending the given hearing. Thus, the reporter can utilize either or both playback tracks to thus monitor the record head to see whether it is properly recording as to both tracks; this can be done intermittently or the operator can leave, for example, the said track two open as to playback, and continuously so.

It is another objective of the invention to incorporate in the system a so-called microphone mixer which is adapted to accommodate a multiple number of microphones, the audio of each one being fed into the mixer. From the mixer all of such audio is then fed into the recorder, with the operator having at his elbow a volume control for each microphone so that the tonal or decibel strength of all microphones are evenly matched to the point of good and adequate reception by the recorder, and understandable transmission to the operator.

Finally, it is an object of the invention to provide a simplified system and method, suited particularly to court reporting, and of the above-mentioned type, which enables easier training of competent court reporters, and is more accurate in operation and far speedier in use than conventional means. In this regard and as stated above, the operator simultaneously constructs or edits the record to introduce such things as punctuation, notations as to exhibit numbers, etc.

DESCRIPTION OF THE DRAWINGS

The structure and mode of operation of my invention may be fully described and better understood by reference to the accompanying drawings wherein.

DETAILED DESCRIPTION OF THE INVENTION

Figures 1, 2, 3:
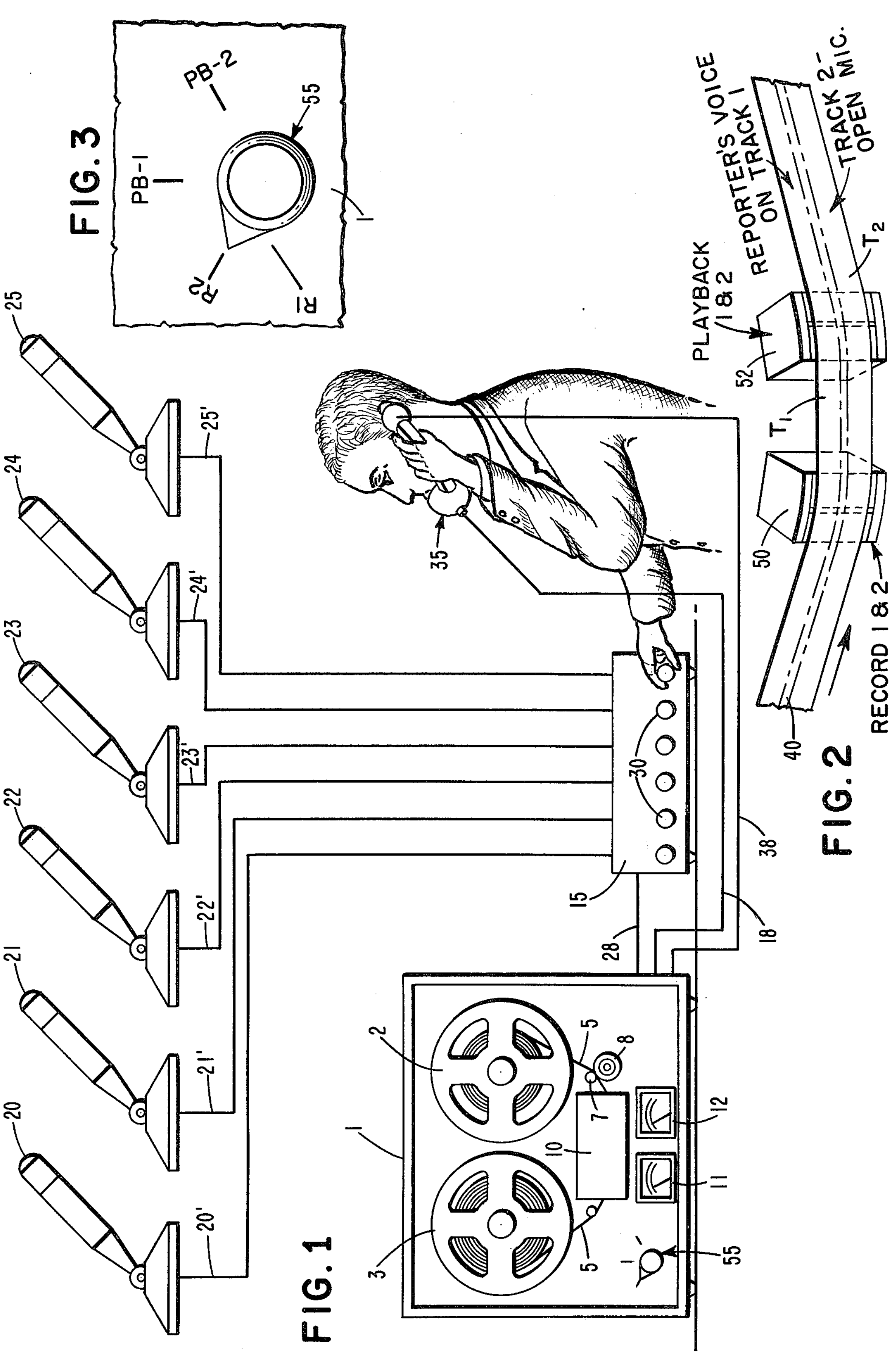
FIG. 1, rather diagrammatic in nature, illustrates the system of the invention wherein a tape recorder, which can have four tracks or more, is equipped to receive audio on two tracks at a time via a suitable microphone mixer, audio transmitted to the latter picked up by a series of microphones, such audio being appropriately amplified, and as to each microphone, to the desired degree within the discretion of the reporter. A line from the recorder feeds into the earphone, upon actuation from the operator, all of such audio so recorded. Also, the operator can playback his own redictation of the oral statements made by each participant.
FIG. 2 is an enlarged, and again largely diagrammatic, representation of the two heads employed in the recorder; the first is the record head and the second represents the playback head; the type of tape here used is of the multiple track version, with the two tracks here illustrated in dotted lines.
FIG. 3 is an enlarged view of a known type of switch device for use by the operator to enable him to monitor that track of the tape recording the voices of the participants, or to selectively playback that track or the other track upon which his own (the reporter's) voice is recorded. As explained below, this may be positioned either upon the front panel of the recorder itself or, as shown in FIG. 1, may be a switch means remote therefrom and adapted to be located immediately at hand or in front of the operator for convenience of use.

With reference now to FIG. 1, the invention hereof is shown in rather diagrammatic form. Any well-known type of tape recorder may be utilized. This is here indicated at 1. These types of mechanisms generally employ wind and rewind spools or reels, here indicated at 2 and 3 respectively. Such, and in accordance with usual practice, enables feed of the tape, generally a magnetic tape and here indicated at 5, through opposed feeding or drive wheels 7 and 8 respectively, and after passage through a record head located behind the panel 10. As pointed out below, the recorder is fitted with both a record as well as replay head, both disposed behind panel 10. Such conventional types of recorders usually also employ so callled VU-meters. These traditionally take the form of simply some form of voltage readout as a signal strength indicator, demonstrating that the audio signal is reaching the recorder at predetermined voltage. Generally, such devices, here shown at 11 and 12 respectively, represent but mere voltage meters. In this instance, one represents voltage strength of the multiple series of microphones fed through the microphone mixer to the recorder, and the other voltage strength of the reporter's voice as fed to the recorder. Such would not, however, indicate otherwise, as whether the recorder is indeed recording.

As here depicted a microphone mixer 15 is used to receive audio impulses from a series of microphones, indicated at 20 through 25 inclusive. The audio from same is fed into the microphone mixer through corresponding lines 20' through 25' inclusive. Such mike-mixer 15 ultimately feeds the combined audio signals through line 28 to the recorder 1. This so called "mike-mixer" is of conventional and well-known type, provided with the necessary circuitry to accomplish the purposes indicated - to combine the audio from each of the individual microphones for transmission via a single line to the recorder. Such circuitry usually includes a suitable matching circuit, or circuits, also well-known to those skilled in the art, to prevent possible feedback from one microphone to another, and so on, thus to exclude possible distortion of the ultimate audio fed to the recorder.

In the invention as herein shown, the mike-mixer also contains additional electrical circuitry to amplify the feed-in of the signal from each microphone. Amplification or de-amplification is controlled through the usual type of potentiometer or volume control device, regulated from the exterior of the mike-mixer cabinet by volume control knobs 30, i.e., a volume control as to each of the series of microphones.

The here-indicated operator, shown at FIG. 1, is depicted at the moment regulating, for example, the volume of microphone 25 through one of these control knobs, interrelated in the manner described. Thus, the operator may, through suitable and known amplification media, readily amplify or diminish the signal strength transmitted through line 25' from microphone 25. It is obvious that each of the other microphones, as to the respective signal strengths thereof (microphones 20–24 inclusive) are similarly controlled as to audio output by the operator. The result is to evenly balance all audio emanating from the several microphones.

The reporter can utilize a combination microphone-earphone instrument or separate instruments. Ths is generally indicated by the numeral 35. The microphone portion of the latter device is preferably of a shielded type, i.e., shielded in such a manner as to diminish exteriorly the voice of the operator, or suppress the same sufficiently, to avoid the operator's voice from being audible to others in his near vicinity. Such microphone instruments, and of various types, are known to the art. One known variation is that marketed under the name HUSH-A-PHONE.

As stated, this instrument used by the operator can be combination microphone-earphone. It can be provided with a startstop control means or button. In the instant case the operator is illustrated as having his thumb pressed down on such button (not shown) for the purposes of actuation of his own microphone as well as the audio he is receiving through the earphone end of the instrument, all of such audio of course being fed through the recording instrument.

At any rate, the simultaneous dictation of the operator is transmitted from the microphone of the instrument, and through line 18, to the recorder 1, wherein it is recorded upon one of the tracks of the recording tape. On the other hand, line 38 receives audio from both record and playback heads of the recorder 1 and feeds same to the earphone element of the combination microphone-earphone 35 held and operated by the reporter.

Referring now to FIG. 2, here is shown, and again in diagrammatic representation, the record and playback heads, employed from left to right in that sequence. The tape is here represented at 40. It is provided with two magnetic tracks $T_1$ and $T_2$. The first of these tracks is for recording of the reporter's voice as he reconstructs the testimony or oral statements made at any hearing. Track $T_2$ records, as stated above, the statements made by all participants at the hearing, each one having a microphone in close proximity to him.

The record head is indicated at 50. Adjacent but rearwardly thereof is located the playback head 52. Direction of tape movement is indicated by the arrow appearing in this figure, or viewing that Figure, from left to right. Thus the arrangement is such that there is continuous recording via head 50 on both of the tracks $T_1$ and $T_2$. Again, the replay head is adapted to replay either one of these tracks upon actuation of the referred to switch means placed at the disposal of the operator.

Such referred to switch means is generally indicated in FIGS. 1 and 3 at 55. The same represents merely a three-way switch, well-known to the art. With the pointer in the position shown in FIG. 1, the operator has adjusted same for record on $T_2$, representing audio receiving from the open microphones in interconnection with the recorder, as hereinbefore described. The operator is at this time thus picking up on his own earphone these recorded statements and is, simultaneously therewith, dictating or constructing his own accurate repeat thereof on track $T_1$.

With the switch means 55 positioned in the alternative position of PB-1 (indicated in FIG. 3), the operator is playing back his own voice on track $T_1$ for the purposes of rechecking his own construction or dictation, this to assure him of the fact that the recorder is indeed recording his statements or construction of testimony on $T_1$. Again, if the operator places the dial of 55 to the position PB-2, then he is receiving through his earphone, playback of the audio recorded through all of the open microphones in the hearing room. Thus, by use of PB-2 he can continuously or intermittently check whether track two is properly recording. Hence, if alternatively he desires to maintain the switch means 55 in position PB-2, he can continuously monitor the oral statements recorded on track two to make sure he has heard aright and has recorded these statements correctly. Of course, the playback head, being located proximate to the record head, will playback only a split second later. However, the experienced reporter will have that proficiency and through use of the system to enable him to constantly monitor the same as to proper performance of the recording apparatus as well as proper and accurate dictation of his own.

Manifestly, this method of recording thus represents not only a much quicker way of ultimate transcription, but offers complete assurance that such transcription is accurate. In this latter regard such is true for the tape can be retained for any length of time as is necessary, e.g., for completion of the record in typewritten form for submission to the involved attorney or participant.

If any question of the accuracy of the ultimate transcription be raised, then the reporter need only replay the tape (and with respect to either of the tracks) to render certain that the statements of the witnesses or participants are accurately recorded and transcribed and that the construction of such statements by the reporter is accurate beyond doubt.

In summary then, this novel system and method incorporates the following facets which materially contribute to the many advantages it inherently possesses:

a. The reporter or operator is able to immediately repeat the statement made and accomplish this with interspersed directions for the preparation of the transcript, the latter comprising such as paragraphs notations, exhibit numbers, and so on. Upon completion of his construction of such oral statements, the tape is ready for reference to the typist for preparation of the final transcription. The intermediate steps of stenotyping or shorthand, followed by later dictation and ultimate typing, are eliminated.

b. The operator has the advantage of a first monitoring facility. This is accomplilshed by playback of either track to assure the reporter of the fact that the recording instrument is properly functioning. He may also pick up audio from the record head for instantaneous rather than delayed hearing.

c. A second monitoring facility is also available to the operator; this puts it within the option of the operator to adjust the volume of the statements made through the various microphones, thus enhancing the ability of the reporter to hear otherwise hard-to-hear participants.

d. The multi-microphone system represents an added attraction to those offered by this novel combination of method steps, for it enables more efficient pick up of the various participants.

e. There is available, through use of this system and method, a convenient side-by-side recording of the reporter's dictation and the oral statements of the actual participants; this enables accurate rechecking of the statements actually made and those statements repeated by the reporter.

f. Finally, a fundamental advantage of the invention resides in reduction of effort, time-wise, of the entire transcription process in that such an operator as a court reporter can now spend his whole time in court rather than with the less remunerative job of further dictation of his own notes to a stenographer, for typing by the latter to obtain the final transcript. In addition, the system makes it possible to adequately train numerous people in court reporting techniques, where such trainees have that important requisite of language comprehension, but more or less lack that particular aptitude which is required for learning known shorthand methods, or learning the frequently used Stenotype procedure. Also, it is the inventor's position that this system and method can accordingly be taught to suitable applicants in a matter of months, whereas with either shorthand or stenotyping, even with regard to a person of unusual aptitude, such competence takes years to develop and particularly as to reporters in the various court judicial systems. The result is that the present acute shortage of competent court reporters can be resolved, and alleviated, via practice of the involved invention claimed herein.

As indicated in the foregoing description of the invention the drawings thereof are in largely diagrammatic form for illustrative purposes. It should, of course, be obvious to those skilled in the art that the wiring circuits may take the form of a two lead postive-negative polarity type, and such a feature as this, among others, is incorporated in the actual construction of the practical assembly. For example, the lines 20' to 25' are indicated as single lines, whereas, as a matter of fact, they would be two current carrying lines (e.g., one to ground, one positive), and so on. Such lines obviously can be coaxial in nature, sheathed in one housing, as is usual in the art. Similarly, the head set wires or the leads to the microphone-earphone combination are shown separately for clarity. Yet it is perfectly obvious that these leads, each respectively connected to the recorder 1 and as shown in FIG. 1, should take the form of the familiar coaxial cable. The same is true of other circuits depicted in the drawings or otherwise referred to herein.

Other advantages and objectives of the invention, as well as obvious modifications thereof, should be apparent from consideration of the foregoing description thereof; however, the invention is not to be deemed confined or limited in any respect, except as required by the several limitations of the claims appended hereto.

What is claimed is:

1. A recording-dictation method particularly adapted to court reporting and like techniques wherein a written transcript is prepared comprising the steps of recording upon one channel of a magnetic tape audio from at least one audio pick-up station, immediately dictating a constructed version of said audio upon another channel of said tape, optionally selecting one or the other of said channels for immediate playback of said audio or said constructed version to thereby monitor said recording continuously or intermittently to assure that there is no malfunction in the equipment, and typing said transcript from said constructed version.

2. The recording-dictation method of claim 1 wherein a plurality of audio pick-up stations feed audio signals into a microphone mixer, and the record volume of said audio from said stations is approximately equalized to thereby control a monitored volume of audio for said recording step and at the same time permit individual station playback volume control to enhance hearing ability of the operator.

* * * * *